United States Patent
Kanz et al.

(10) Patent No.: US 11,648,613 B2
(45) Date of Patent: May 16, 2023

(54) HOLDER FOR A BROACHING TOOL

(71) Applicant: Hartmetall-Werkzeugfabrik Paul Horn GmbH, Tuebingen (DE)

(72) Inventors: Andreas Kanz, Gammertingen (DE); Matthias Luik, Reutlingen (DE)

(73) Assignee: Hartmetall-Werkzeugfabrik Paul Horn GmbH, Tuebingen (DE)

( * ) Notice: Subject to any disclaimer, the term of this patent is extended or adjusted under 35 U.S.C. 154(b) by 296 days.

(21) Appl. No.: 16/819,669

(22) Filed: Mar. 16, 2020

(65) Prior Publication Data
US 2020/0215628 A1 Jul. 9, 2020

Related U.S. Application Data

(63) Continuation of application No. PCT/EP2018/077077, filed on Oct. 5, 2018.

(30) Foreign Application Priority Data

Oct. 12, 2017 (DE) .................. 10 2017 123 786.0

(51) Int. Cl.
*B23D 43/04* (2006.01)
*B23D 13/00* (2006.01)
(Continued)

(52) U.S. Cl.
CPC .............. *B23D 13/00* (2013.01); *B23B 27/10* (2013.01); *B23B 27/16* (2013.01); *B23B 2250/12* (2013.01)

(58) Field of Classification Search
CPC ...... B23D 13/00; B23D 13/005; B23D 41/00; B23D 37/00; B23B 27/10; B23B 2250/12; B23B 29/12; B23Q 11/10; B23Q 11/00
See application file for complete search history.

(56) References Cited

U.S. PATENT DOCUMENTS 6,302,004 B1 10/2001 Taylor
8,007,208 B2 8/2011 Noureddine
(Continued)

FOREIGN PATENT DOCUMENTS

CN 201320633 Y 10/2009
CN 203356705 U 12/2013
(Continued)

OTHER PUBLICATIONS

Decision to Grant a Patent for an Invention (Including Translation) for Russian Patent Application No. 2020111821/05(020028), dated Nov. 12, 2020.
(Continued)

*Primary Examiner* — Alan Snyder
(74) *Attorney, Agent, or Firm* — Jason H. Vick; Sheridan Ross, PC

(57) ABSTRACT

Broaching tool comprising a cutting insert having a cutting edge and a holder for holding the cutting insert. The holder has a clamping region and a holding region, wherein the holding region comprises, at its end facing away from the clamping region, a seat for the cutting insert, which is configured and arranged such that, when the cutting insert is mounted in the seat, its cutting edge projects beyond the circumferential surface of the holding region. The holding region furthermore comprises, on its circumferential surface, a support for the cutting insert. A coolant channel extends into the inside of the holder, which coolant channel comprises two exit openings which, as seen in the circumferential direction, are arranged laterally adjacent to the support and/or in lateral surfaces of the support.

10 Claims, 4 Drawing Sheets

(51) Int. Cl.
 B23B 27/10 (2006.01)
 B23B 27/16 (2006.01)

(56) References Cited

U.S. PATENT DOCUMENTS

| | | | |
|---|---|---|---|
| 8,137,034 | B2 | 3/2012 | Noureddine |
| 2002/0012573 | A1 | 1/2002 | Hill |
| 2008/0240872 | A1 | 10/2008 | Rimet |
| 2009/0185873 | A1 | 7/2009 | Noureddine |
| 2010/0178116 | A1 | 7/2010 | Watanabe et al. |
| 2014/0133924 | A1 * | 5/2014 | Oren .................. B23B 27/10 407/11 |
| 2015/0343534 | A1 | 12/2015 | Kaufmann et al. |
| 2016/0136733 | A1 | 5/2016 | Kaufmann et al. |
| 2016/0339523 | A1 | 11/2016 | Graf et al. |

FOREIGN PATENT DOCUMENTS

| | | | | |
|---|---|---|---|---|
| CN | 204171430 U | 2/2015 | | |
| CN | 204545552 U | 8/2015 | | |
| CN | 205904465 U | 1/2017 | | |
| DE | 3934703 A1 | 4/1991 | | |
| DE | 102006035182 A1 | 1/2008 | | |
| DE | 102007048111 A1 | 3/2009 | | |
| DE | 102007057157 A1 | 5/2009 | | |
| EP | 0100376 A2 | 2/1984 | | |
| EP | 2212041 B1 | 11/2013 | | |
| EP | 2049293 B1 | 10/2014 | | |
| EP | 3112062 A1 * | 1/2017 | ............. | B23B 27/10 |
| JP | S59-042205 A | 3/1984 | | |
| JP | H05-041656 U | 6/1993 | | |
| JP | H05-056360 U | 7/1993 | | |
| JP | H0631502 A * | 2/1994 | | |
| JP | H06-083205 U | 11/1994 | | |
| JP | H10-094904 A | 4/1998 | | |
| JP | H10-146704 A | 6/1998 | | |
| JP | 2009-544484 A | 12/2009 | | |
| JP | 2010-510897 A | 4/2010 | | |
| JP | 2015-512794 A | 4/2015 | | |
| JP | 2017-503669 A | 2/2017 | | |
| JP | 2018-111205 A | 7/2018 | | |
| SU | 195834 A | 5/1967 | | |
| SU | 887084 A1 | 12/1981 | | |
| SU | 1763107 A1 | 9/1992 | | |
| WO | WO 2008/066474 | 6/2008 | | |
| WO | WO 2009/068130 | 6/2009 | | |
| WO | WO 2013/132480 | 9/2013 | | |
| WO | WO 2015/110132 | 7/2015 | | |
| WO | WO-2017056969 A1 * | 4/2017 | | |

OTHER PUBLICATIONS

Translation of Decision to Grant a Patent for corresponding Japanese Patent Application No. 2020-517289, dated Jan. 25, 2022.
International Preliminary Report on Patentability for International Application No. PCT/EP2018/077077, dated Apr. 23, 2020.
First Office Action (Including Machine Translation) for corresponding Chinese Patent Application No. 201880066158, dated Feb. 26, 2021.
International Search Report for International Application No. PCT/EP2018/077077, dated Mar. 25, 2019.
Written Opinion for International Application No. PCT/EP2018/077077, dated Mar. 25, 2019.
Notification of Reason for Rejection (Including Translation) for corresponding Japanese Patent Application No. 2020-517289, dated Jun. 8, 2021.
Examination Report for corresponding Canadian Application No. 3,076,030, dated Apr. 28, 2021.

* cited by examiner

HOLDER FOR A BROACHING TOOL

CROSS REFERENCE TO RELATED APPLICATIONS

This application is a continuation of international patent application PCT/EP2018/077077, filed on Oct. 5, 2018 designating the U.S., which international patent application has been published in German language and claims priority from German patent application DE 10 2017 123 786.0, filed on Oct. 12, 2017. The entire contents of these priority applications are incorporated herein by reference.

BACKGROUND OF THE INVENTION

This disclosure relates to a broaching tool.

Broaching is a machining method for introducing longitudinal slots in a wide variety of forms into a workpiece. In broaching, the broaching tool executes a linear advancing movement—the working stroke. Subsequently, removal of the broaching tool from the workpiece and a return stroke without machining take place. The feed motion for the removal of material takes place via the gradual displacement of the broaching tool until the desired profile depth and/or profile width is achieved.

An exemplary broaching tool is known from EP 2 212 041 A1. The broaching tool comprises a cutting insert having a cutting edge and a holder for holding the cutting insert. The holder comprises a clamping region for clamping into a machine tool and a holding region for holding the cutting insert. The holding region comprises, an at its end facing away from the clamping region, a seat for the cutting insert, for example in the form of an end-face depression, which is configured and arranged such that, when the cutting insert is mounted in the seat, its cutting edge projects beyond the circumferential surface of the holding region. The holding region is provided with a support for the cutting insert on its circumferential surface, which support absorbs forces acting on the cutting insert during processing and therefore supports the cutting insert.

Cooling and lubrication of the machining process is also important when broaching. However, supplying cooling lubricant (simply referred to as coolant here) at the machining point when broaching internal slots in bores is particularly difficult. In this case, a frequently used external coolant supply via hoses and lines does not adequately guide the coolant to the machining point. Therefore, broaching tools with an internal coolant supply are also used for broaching internal slots. However, the known solutions do not offer adequate and reliable cooling/lubrication.

SUMMARY OF THE INVENTION

It is an object to provide a broaching tool, which ensures improved and reliable cooling/lubrication.

According to an aspect, a broaching tool is presented which comprises:
 a cutting insert having a cutting edge; and
 a holder which is configured to hold the cutting insert;
 wherein the holder comprises a clamping region and a holding region, wherein the holding region comprises, at one of its ends facing away from the clamping region, a seat for the cutting insert, which is configured and arranged such that, when the cutting insert is mounted into the seat, the cutting edge projects beyond a circumferential surface of the holding region,
 wherein the holding region comprises, on the circumferential surface of the holding region, a support for the cutting insert, wherein the support comprises a support body which is integrally formed with the holder and radially projects from the circumferential surface of the holding region, and
 wherein a coolant channel extends inside the holder, wherein the coolant channel comprises two lateral exit openings which, as seen in a circumferential direction of the holder, are arranged laterally adjacent to the support and/or in lateral surfaces of the support.

In the broaching tool, the coolant flows through the holder, wherein the guidance of the coolant through the coolant channel is configured such that it exits laterally adjacent to and/or at the support, i.e. in the immediate vicinity of the cutting insert. It is thus ensured, on the one hand, that the coolant does not have to cover a long distance to the machining point after exiting from the exiting openings, and therefore reliably impinges the cutting insert. Reliable cooling and lubrication can furthermore also be ensured for long processing depths in bores. The coolant also impinges reliably the machining point at the start of the machining process, i.e. when the broaching tool begins the machining process at the start of a bore, for instance, and not only once a certain length has been machined in the bore. Finally, this also prevents the problem of a chip between the machining point and an exit opening preventing the coolant from impinging the machining point, since the coolant impinges the cutting insert from lateral directions, where the risk of a chip being formed there is generally lower.

In a refinement, it is provided that the distance of the exit openings from the seat is smaller than from the clamping region. This brings about that the best possible cooling and lubrication is achieved, i.e. that the exiting coolant impinges the machining point as accurately as possible.

In a further refinement, it is provided that the coolant channel and/or the exit openings are configured and arranged such that exiting coolant impinges the cutting edge and/or lateral flanks adjoining the cutting edge (also referred to as the main cutting edge) and/or corners of the cutting insert which are located between the cutting edge and the flanks. It is therefore possible to specifically determine which points of the cutting insert are to be impinged by the lubricant. In contrast to known tools, it can therefore be provided that the flanks (also referred to as auxiliary cutting edges) and/or corners of the cutting insert are specifically impinged by the coolant to bring about immediate cooling there, which contributes to a longer lifetime and a reduction in wear.

In one refinement, it is furthermore provided that the coolant channel comprises a third exit opening, which is arranged on the upper side of the support. This third exit opening is preferably configured and arranged such that it is aligned with the cutting edge so that coolant exiting there preferably cools the cutting edge directly, while the two lateral exit openings are aligned with the lateral flanks/auxiliary cutting edges and/or the corners between the flanks and the cutting edge.

In one refinement, it is provided that the coolant channel comprises one main channel extending through the clamping region and two lateral channels branching off from the main channel in the holding region, which two lateral channels lead into the lateral exit openings. This represents a simple refinement of the coolant channel, which can be produced in a cost-effective manner.

In further refinements, it is provided that the main channel merges into a third lateral channel, which leads into a third exit opening on the upper side of the support.

The transition between the main channel and lateral channels can be configured in different ways. In one refinement, it is provided that the lateral channels extend from the main channel arranged centrally in the inside to the respective exit opening at an angle through the holding region. It can alternatively be provided that a transverse channel, which is arranged transversely, in particular perpendicularly to the longitudinal axis of the holder or the main channel and into which the main channel leads and from which the lateral channels branch, is located between the main channel and the lateral channels. For structural considerations, it can be advantageous, for example, to provide a transverse channel in order to align the exit direction of the coolant stream of the lateral channels with the flanks/auxiliary cutting edges. If the diameter of the main channel is not greater than the width of the support, lateral channels connected directly to the main channel would produce an outwardly directed coolant stream, which does not arrive at the flanks laterally adjacent to the main cutting edge. The transverse channel offers flexibility here when specifying the exit direction. However, the ultimate function is substantially identical for both variants.

It goes without saying that the features mentioned above and those yet to be explained below are usable not only in the combination given in each case, but also in other combinations or on their own, without departing from the spirit and scope of the present disclosure.

DESCRIPTION OF PREFERRED EMBODIMENTS

Figure 1:
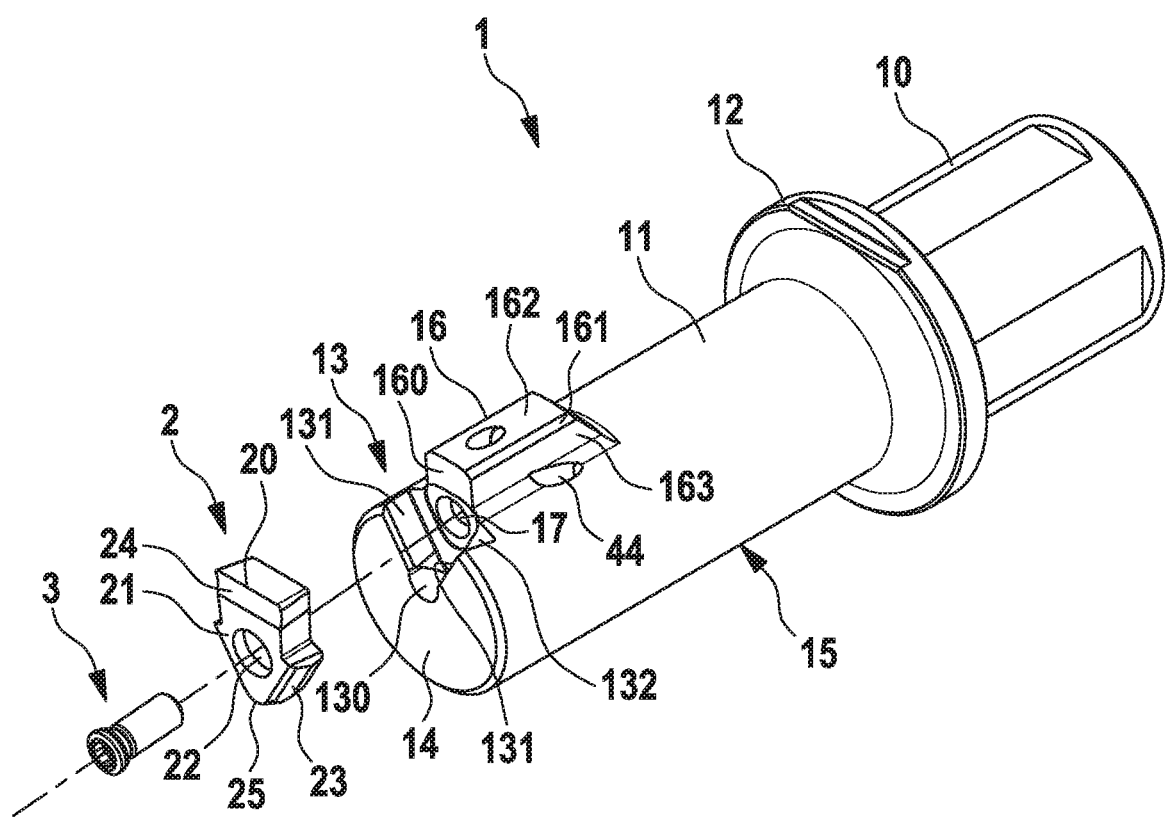
FIG. 1 a perspective view of the broaching tool as an exploded illustration.
Figure 2:
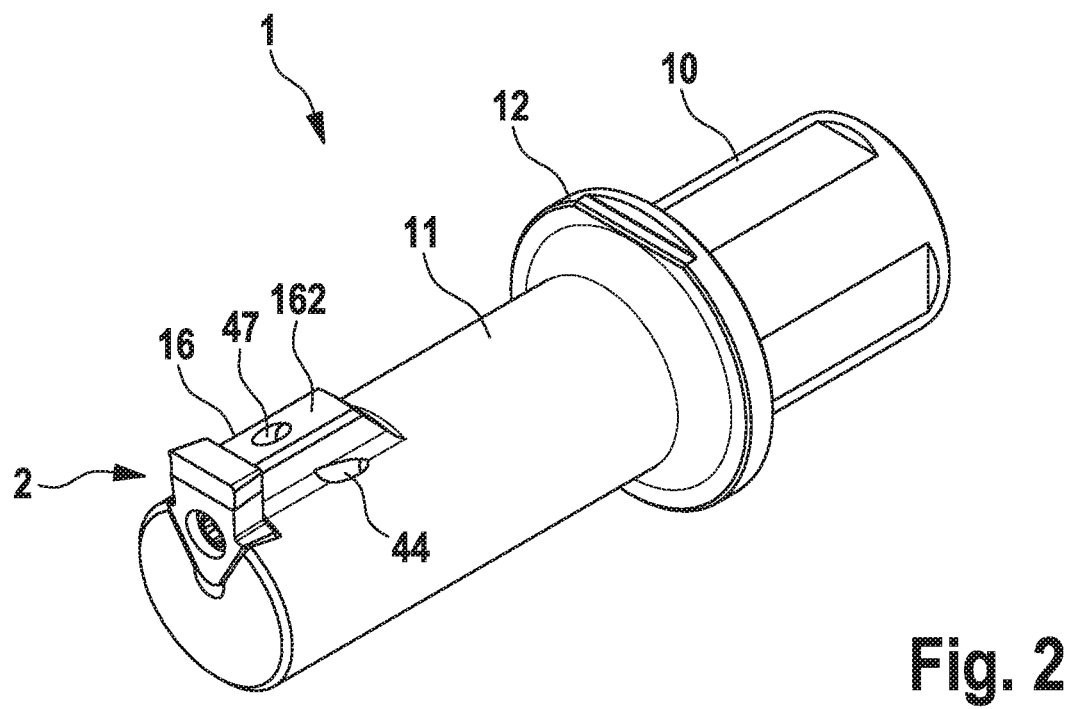
FIG. 2 a perspective view of the broaching tool in the assembled state.
Figure 3:
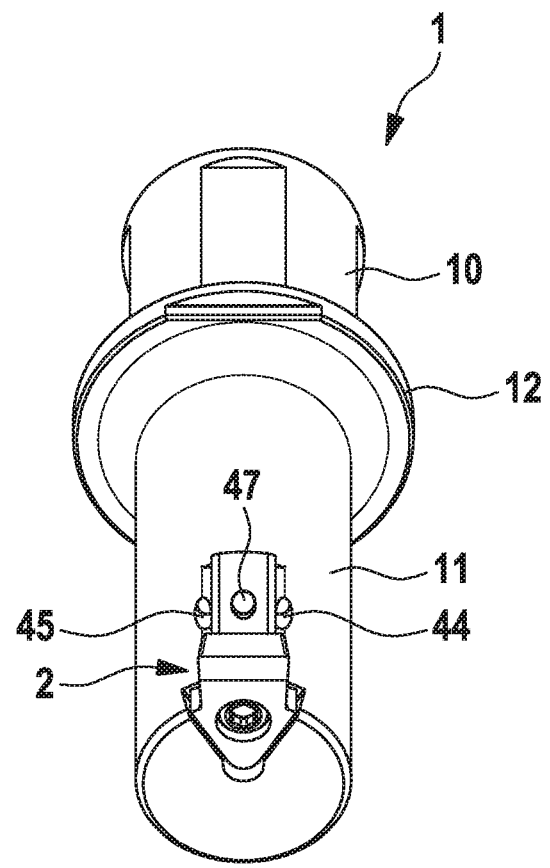
FIG. 3 a perspective view of the broaching tool from the front.

FIG. 1 shows a perspective exploded illustration of an embodiment of a broaching tool. FIGS. 2 and 3 show this embodiment in the assembled state as a perspective angled view (FIG. 2) and a perspective front view (FIG. 3). The broaching tool substantially comprises a holder 1 and a cutting insert 2. The holder 1 comprises a clamping region 10 for clamping into a machine tool, for example a spindle, a holding region 11 for holding the cutting insert 2 and a flange 12 located in between. At its end face facing way from the clamping region 10, the holding region 11 comprises a seat 13 in which the cutting insert 2 can be received and fastened therein. The seat 13 is formed by an open depression in the end face 14 and in the circumferential surface 15 of the holding region 11. This depression comprises, starting from the depression base 130, seat walls 131 which, starting from the depression base 130, extend in a mutually diverging manner towards the circumferential surface 15 of the holding region 11. The receiving space of the seat 13 for the cutting insert 2 therefore has a V-shaped cross-section in the embodiment shown.

The rear end surface 132 of the seat 13 is located in a common plane with a supporting surface 160 of a support 16 (also referred to as a supporting body) so that the supporting surface 160 forms a direct continuation of the rear end surface 132 of the seat 13. A continuous planar contact surface is therefore available for the cutting insert 2 fastened in the seat 13, which contact surface continues radially beyond the outer circumference of the holding region 11 with the supporting surface 160 of the support 16.

The support 16 is formed on the circumferential surface 15 of the holding region 11 as an integral, radially projecting supporting body formed in one piece. In this case, the support 16 in this embodiment has the form of a block which is slightly chamfered towards its upper or outer side and which, apart from the chamfers 161, possesses an approximately square cross-section with an upper side 162 and lateral surfaces 163. This support serves in particular to introduce cutting forces and generated torques into the holding region 4 via the projecting support in the immediate vicinity of the point of application, which contributes to a reduction in the load torques acting on the cutting insert 2.

The cutting insert 2 has a main cutting edge 20, with which, for example, an internal slot can be broached within a bore. On its rear side opposite the main cutting edge 20, the cutting insert 2 has a planar contact surface which, when the cutting insert 2 is received in the seat 13, abuts with form fit against the rear end surface 132 and the radially continuing supporting surface 160. As can be seen in FIG. 1, a threaded bore 17 for a clamping screw 3 is located at the transition region between the end surface 132 and the supporting surface 160, which clamping screw is in the form of a countersunk screw which reaches through a through bore 22 in the cutting insert 2 and by means of which the cutting insert 2 can be firmly clamped into the seat 13. The fastening part 21 of the cutting insert 2 is then located with lateral walls 23 in lateral contact with the lateral walls 131 and the cutting part 24 of the cutting insert 2 which is adjacent to the main cutting edge 20 abuts against the supporting surface 160 of the support 16.

As can likewise be seen in FIGS. 1 to 3, the fastening part 21 of the cutting insert 2 configured in a block shape substantially has a wedge shape, which is adapted to the V-shaped receiving cross-section of the seat 13, wherein the wedge shape in the present embodiment is rounded in the lower vertex region 25. The lateral walls 23 of the fastening part 21 which extend in a diverging manner from the vertex region 25 have surface regions which deviate from the planar configuration or a certain spherical design for optimum contact with the seat walls 131. The ends of the seat walls 131 at the depression base 130 are separated from one another by a cut-out in the form of a partial bore so that a clearance between the holder 1 and the vertex region 130 of the cutting insert 2 received in the seat 13 is generated at the depression base 130.

Figure 7:
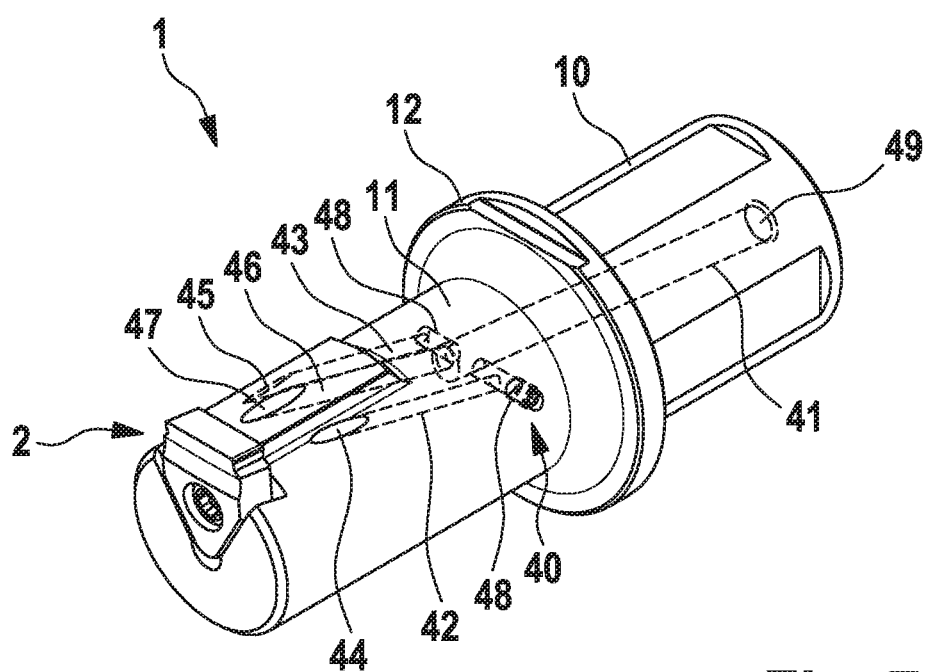
FIG. 7 a perspective view of a broaching tool with an internal view of a second refinement of the cooling channel.

It is provided that a coolant channel 40 extends in the interior of the holder 1. This coolant channel 40 is shown in a first embodiment in FIGS. 4 to 6 as a perspective angled illustration (FIG. 4), as a sectional view (FIG. 5) and as a plan view (FIG. 6). FIG. 7 shows a second embodiment of the coolant channel 40 in a perspective angled illustration. The coolant channel 40 comprises a main channel 41 and at least two lateral channels 42, 43. The main channel 41 extends centrally through the clamping region 10 and preferably a short distance into the holding region 11. There, the two lateral channels 42, 43 branch off from the main channel 41. The two lateral channels 42, 43 extend at an angle through the holding region and lead into exit openings 44, 45 which are arranged laterally adjacent to the support 16, as seen in the circumferential direction, and/or in the lateral surfaces 163 of said support. The exit openings 44, 45 are therefore preferably arranged completely adjacent to the support 16 (in the circumferential surface 15 of the holding region 11) or completely in the lateral surfaces 163. However, it can also be provided that the exit openings 44, 45 are each arranged partially adjacent to the support 16, i.e. in the circumferential surface 15 of the holding region 11, and partially in (or on) the adjacent lateral surface 163 of the support 16.

Coolant introduced into the main channel 41 at the entry opening 49 therefore flows through the main channel 41 and the lateral channels 42, 43 until it exits at the exit openings 44, 45. Since these exit openings 44, 45 are arranged in the immediate vicinity of the cutting insert 2, the coolant impinges reliably the cutting part 24 thereof in order to bring about the desired cooling or lubrication at the machining point there.

In this case, it is preferably provided that the exit openings 44, 45 are arranged as near as possible to the seat 13. It is furthermore preferably provided that the lateral channels 42, 43 and/or the exit openings 44, 45 are configured and arranged such that, is to say for example, they have such a course through the holding region 11 and such a configuration of their opening that the exiting coolant impinges the cutting edge 20 and/or lateral flanks 26 adjoining the cutting edge 20 (or auxiliary cutting edges located there) and/or corners 27 of the cutting insert 2 which are located between the cutting edge 20 and the flanks 26. This ensures good cooling and lubrication of the flanks (auxiliary cutting edges) and cutting corners/radii of the cutting insert 2, even for long processing depths in bores.

It is furthermore preferably provided that the coolant channel 40 comprises a third lateral channel 46, which leads into a third exit opening 47. The third lateral channel 46 preferably likewise branches off from the main channel 41 and extends at an angle through the holding part 11, wherein it preferably leads into the third exit opening 47 on the upper side 162 of the support 16. In this case, the third lateral channel 46 and/or the third exit opening 47 is preferably configured and arranged such that exiting coolant preferably impinges the cutting edge 20 in order to bring about indirect cooling and lubrication at the machining point there.

Figure 4:
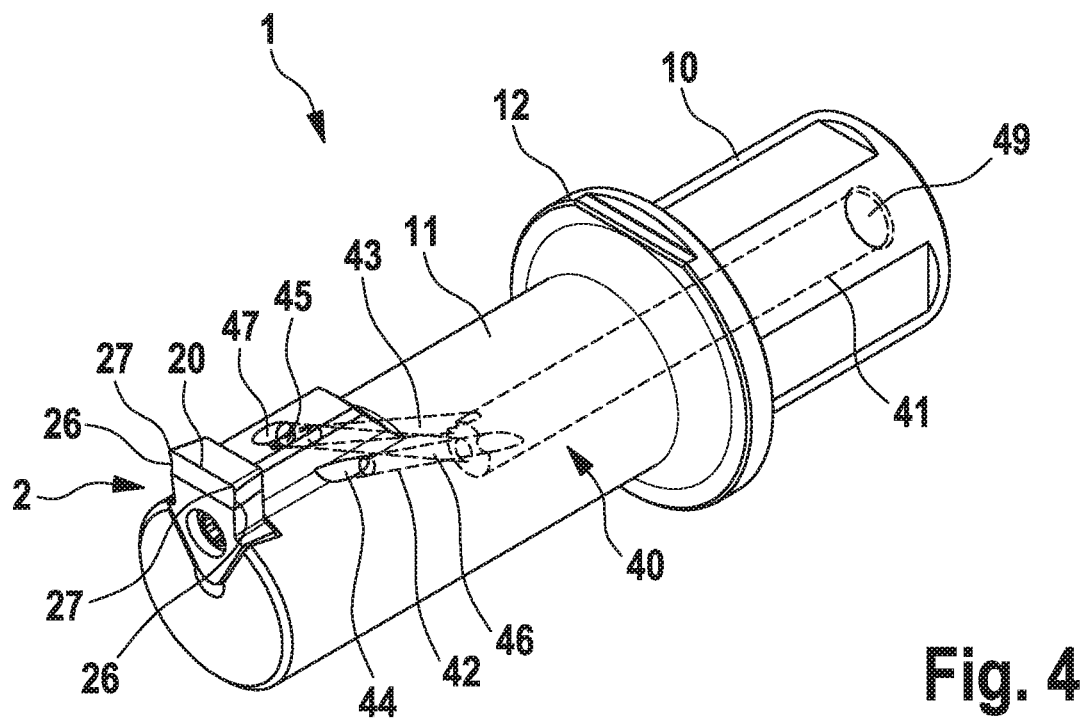
FIG. 4 a perspective view of the broaching tool with an internal view of a first refinement of the cooling channel.
Figure 5:
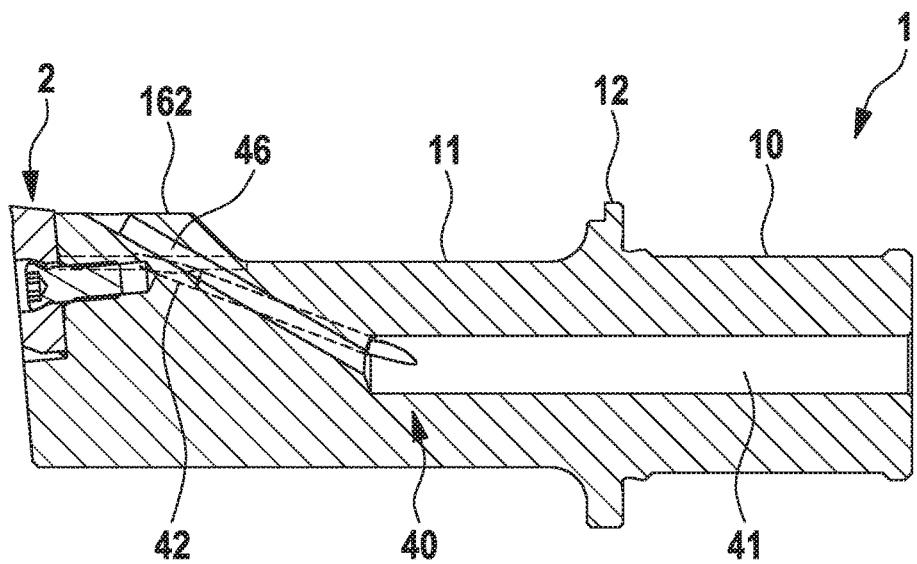
FIG. 5 a lateral sectional illustration of the embodiment shown in FIG. 4 of the broaching tool.
Figure 6:
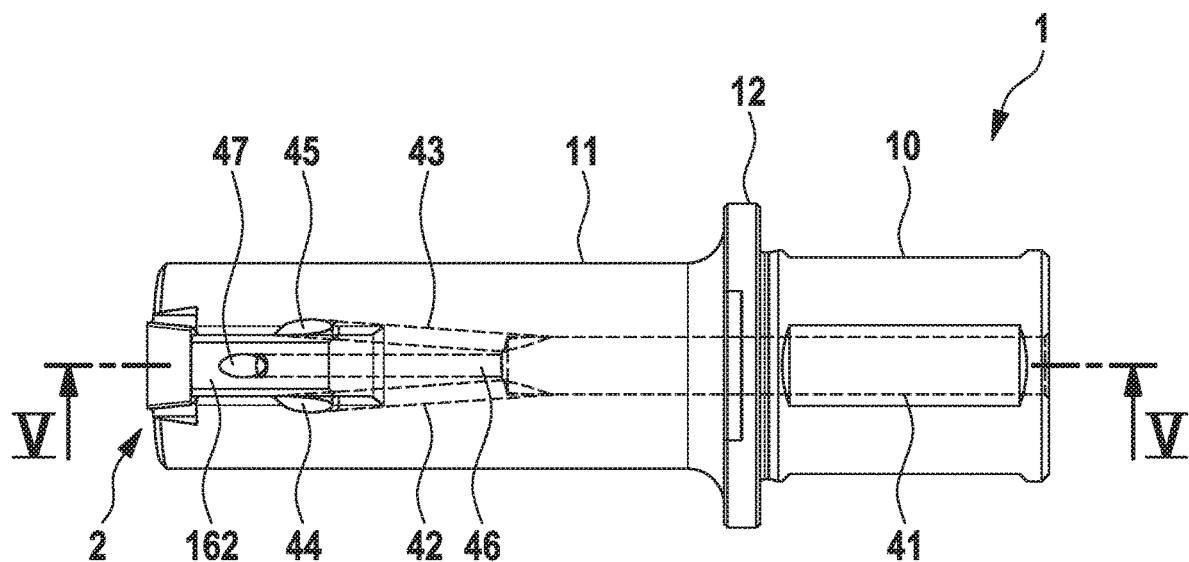
FIG. 6 a plan view of the embodiment shown in FIG. 4 of the broaching tool.

In contrast to the embodiment shown in FIGS. 4 to 6, the lateral channels 42, 43 in the embodiment of the coolant channel 40 shown in FIG. 7 do not branch off directly from the main channel 41; instead a transverse channel 48 is provided there, which extends transversely (preferably perpendicularly) to the main channel 41 (and transversely to the direction of the longitudinal extent of the holder 1) and branches off from the main channel 41 and from which at least the lateral channels 42, 43 in turn branch off. This does not result in any substantial change in terms of the functionality, but it does enable alternative production of the coolant channel 40 in the holder 1 and possibly a better option for determining the direction of the lateral channels 43, 44 and therefore the exit direction of the coolant from the lateral channels 42, 43.

By means of the holder and the broaching tool with such a holder, an improved cooling and lubrication of the cutting insert, in particular the cutting edge thereof and flanks (auxiliary cutting edges) adjoining the cutting edge and cutting corners or cutting radii is achieved.

Of course, the present disclosure is not restricted to the exemplary embodiments shown. Many different variations, for example with regard to the refinement of the cutting insert, for instance the arrangement, configuration and number of cutting edges and cutting corners, are directly conceivable. Accordingly, the number and arrangement of the coolant channels or their exit openings can also be varied in order to achieve the desired purpose. The course of the entire coolant channel within the holder can also be configured differently, as illustrated in the figures.

What is claimed is:

1. A broaching tool comprising:
a cutting insert having a cutting edge; and
a holder which is configured to hold the cutting insert;
wherein the holder comprises a clamping region and a holding region, wherein the holding region comprises, at one of its ends facing away from the clamping region, a seat for the cutting insert, which is configured and arranged such that, when the cutting insert is mounted into the seat, the cutting edge projects beyond a circumferential surface of the holding region,
wherein the holding region comprises, on the circumferential surface of the holding region, a support for the cutting insert, wherein the support comprises a support body which is integrally formed with the holder and radially projects from the circumferential surface of the holding region, wherein the support body comprises a supporting surface on which a rear side of the cutting insert abuts,
wherein a coolant channel extends inside the holder, wherein the coolant channel comprises two lateral exit openings which, as seen in a circumferential direction of the holder, are arranged laterally adjacent to the support body and/or in lateral surfaces of the support body, and
wherein the coolant channel comprises a third exit opening, which is arranged on an upper side of the support body that forms a radially outermost end face of the support body and is arranged transverse to the supporting surface.

2. The broaching tool as claimed in claim 1, wherein a first distance between each of the two lateral exit openings and the seat is shorter than a second distance between each of the two lateral exit openings and the clamping region.

3. The broaching tool as claimed in claim 1, wherein the coolant channel and/or the two lateral exit openings are configured and arranged such that exiting coolant impinges the cutting edge and/or lateral flanks adjoining the cutting edge and/or corners of the cutting insert which are located between the cutting edge and the flanks.

4. The broaching tool as claimed in claim 1, wherein the coolant channel and/or the two lateral exit openings and the third exit opening are configured and arranged such that coolant exiting from the third exit opening impinges the cutting edge and that coolant exiting from the two lateral exit openings impinges flanks adjoining the cutting edge and/or corners of the cutting insert which are located between the cutting edge and the flanks.

5. The broaching tool as claimed in claim 1, wherein the coolant channel comprises a main channel extending through the clamping region and two lateral channels branching off from the main channel in the holding region, wherein the two lateral channels lead into the lateral exit openings.

6. The broaching tool as claimed in claim 5, wherein the main channel merges into a third lateral channel, which leads into the third exit opening.

7. The broaching tool as claimed in claim 5, wherein the lateral channels extend from the main channel, which is arranged centrally inside the holder, to a respective one of the two lateral exit openings and the third exit opening at an angle through the holding region.

8. The broaching tool as claimed in claim 5, wherein a transverse channel, which is arranged transversely to a longitudinal axis of the holder and into which the main channel leads and from which the lateral channels branch, is located between the main channel and the lateral channels.

9. A broaching tool comprising:
   a cutting insert having a cutting edge; and
   a holder which is configured to hold the cutting insert;
   wherein the holder comprises a clamping region and a holding region, wherein the holding region comprises, at one of its ends facing away from the clamping region, a seat for the cutting insert, which is configured and arranged such that, when the cutting insert is mounted into the seat, the cutting edge projects beyond a circumferential surface of the holding region,
   wherein the holding region comprises, on the circumferential surface of the holding region, a support for the cutting insert, wherein the support comprises a support body which is integrally formed with the holder and radially projects from the circumferential surface of the holding region, and
   wherein a coolant channel extends inside the holder and comprises two lateral channels, each of which leads into a respective one of two lateral exit openings, wherein the two lateral exit openings are, as seen in a circumferential direction of the holder, arranged on opposite sides of the support body laterally adjacent to the support body, and the two lateral channels extend parallel to one another, so that coolant exits the two lateral exit openings in two parallel coolant jets impinging the cutting edge and/or lateral flanks adjoining the cutting edge and/or corners of the cutting insert that are located between the cutting edge and the flanks, and
   wherein the coolant channel comprises a main channel extending through the clamping region and a transverse channel extending transversely to the main channel, wherein the two lateral channels branch off from the transverse channel.

10. The broaching tool as claimed in claim 9, wherein the main channel merges into a third lateral channel, which leads into a third exit opening which is arranged on an upper side of the support body, wherein said upper side faces away from the circumferential surface of the holding region.

* * * * *